June 24, 1947.                J. J. ANTALEK                    2,422,878
                        HIGH LEVEL MODULATION SYSTEM
                          Filed Nov. 13, 1943            5 Sheets-Sheet 1

INVENTOR.
John J. Antalek
BY
ATTORNEY

June 24, 1947.  J. J. ANTALEK  2,422,878
HIGH LEVEL MODULATION SYSTEM
Filed Nov. 13, 1943  5 Sheets-Sheet 2

INVENTOR.
John J. Antalek
BY
ATTORNEY

Fig. 5.

Kcs. off resonance

INVENTOR
John J. Antalek
BY
ATTORNEY

Patented June 24, 1947

2,422,878

UNITED STATES PATENT OFFICE 2,422,878

HIGH LEVEL MODULATION SYSTEM

John J. Antalek, Chicago, Ill., assignor to The Rauland Corporation, Chicago, Ill., a corporation of Illinois Application November 13, 1943, Serial No. 510,121

14 Claims. (Cl. 179—171.5)

This invention relates to modulation systems employed in connection with radio telegraph and telephone transmitters. More particularly, this invention relates to a system and method for securing high level modulation.

One object of this invention is to allow the operation of a transmitting electronic tube in such fashion that the power dissipation of such tube is at a minimum over a portion of a given transmitting period, while the power dissipation takes place in intermittent peaks, thus allowing a tube of a given size to yield a peak output of several times the power which such tube could handle continuously.

Another object of my invention is to provide a transmitting system in which substantially distortionless modulation may be carried to an extent much greater than the 100 per cent modulation ordinarily considered the limit of modulation without distortion.

Another purpose of my invention is to provide a modulation system in which the carrier is suppressed to any desired extent, during periods when actual modulation is not taking place.

Yet another purpose of this invention is to provide a transmitting system in which the carrier minima extend toward zero to any desired extent, but yet do not cause distortion, while the carrier maxima reach values more than double the value of the unmodulated carrier, so that modulation greater than 100 per cent in the direction of these maxima is secured.

Still another object of my invention is to secure a greater peak power output from a class "B" modulated amplifier, this being accomplished with substantially no distortion, since the carrier wave is at no time completely cut off.

Another purpose of my invention is to secure, in a carrier transmission system, a better signal readability, by consequence of placing a larger proportion of the power transmitted in the side band frequencies.

Yet another object of my invention is, in a carrier transmission system, to secure better efficiency from a given electronic tube, by keeping the average power input relatively low, while the peak power output is kept relatively high.

The present invention is based upon certain circuits and systems disclosed in my co-pending applications (Serial No. 442,185, filed May 8, 1942 and issued as Patent No. 2,372,701 on April 3, 1945, and Serial No. 466,404, filed November 21, 1942 and issued as Patent No. 2,348,585 on May 9, 1944).

In order more fully to explain my invention, reference is made to the accompanying drawings where.

Figure 1:
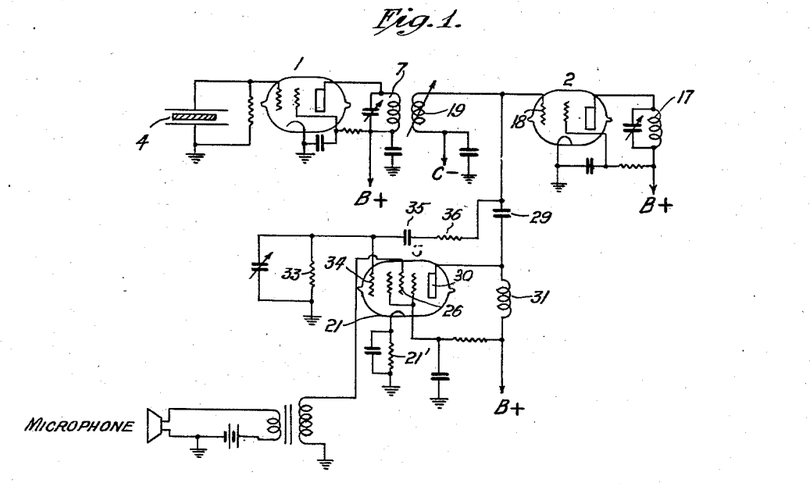
Fig. 1 represents an impedance modulated transmitter embodying one form of modulation system according to my invention.

Referring now to Fig. 1, the details of the circuit there shown are fully described in my co-pending applications above-mentioned and, accordingly, there are herein described only such portions of the circuit as are essential to an understanding of the operation of the present invention.

Electron tube 1, excited by piezo-electric crystal 4, yields its output to tuned coil 7. Electron tube 2 acts as the modulated amplifier tube, yielding its output to tuned circuit 17 and having the grid 18 excited by the oscillatory energy derived conductively from coil 19, which latter coil is coupled to tuned coil 7.

Electron tube 3 constitutes the variable reactance modulator, having the control grid 26 excited by the modulating audio-frequency currents, and the control grid 34 and anode 30, suitably coupled via condensers 29 and 35 and resistor 36, to the upper end of coil 19. The operation of electron tube 3 as an electron-controlled variable capacity, is fully explained in the copending applications above-described, and such operation causes the transfer of energy between coil 7 and coil 19 to be modulated in accordance with the varying reactance of the tuned circuit comprising coil 19 and variable reactance tube 3.

Figure 5:
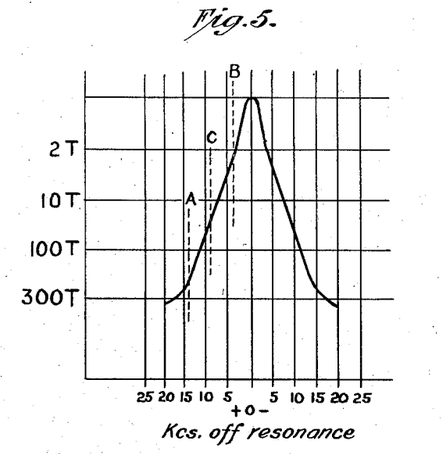
Fig. 5 is a graphical representation of the resonance curve of certain of the tuned circuits utilized in connection with this invention.

In Fig. 5 is shown the resonance curve of this last-described circuit, illustrating the variation along the linear portion of the curve, between points A and B, as this circuit is modulated. Since this variation is substantially linear, distortion in this portion of the system is substantially absent. In this figure, point C represents the quiescent point used for ordinary type modulation. In practicing the present invention, point C is shifted to other positions, as hereinafter explained.

Figure 7:
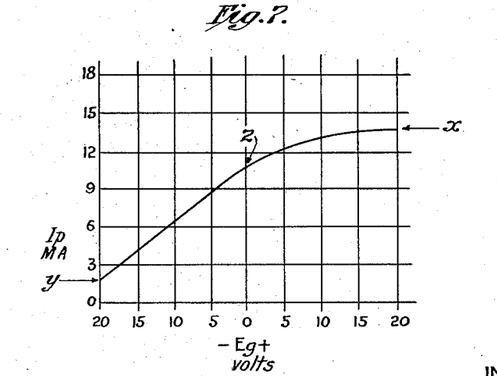
Fig. 7 is a representation of a typical grid potential-anode current graph of a reactance modulator tube, as used in systems according to my invention.

Referring now, additionally, to Fig. 7, there is here shown the characteristic curve of electron tube 3, when the potential of the audio-frequency control grid varies from zero potential, it being understood that the various potentials and the cathode bias resistor 21' of Fig. 1 are suitably adjusted so that the tube will so act. The actual values of the electrical constants employed for securing this result, will vary with the particular type of construction and supply voltages employed for tube 3, and will be apparent to one skilled in the art.

It will be noted by reference to Fig. 7, that the reactance tube modulator is biased, not at a mid-point of the linear portion of its characteristic curve, but at a point much nearer the maximum plate current. This results in a comparatively large change in reactance during the negative portion of the alternating current grid input cycle and a relatively small change in reactance during the positive portion of this same cycle.

Figure 9:
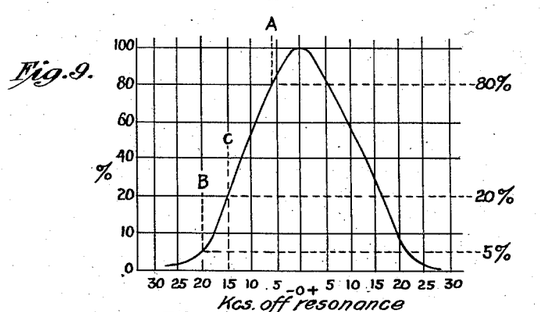
Fig. 9 is a graphical representation of the resonance curve of a modulated amplifier tube employed according to my invention in a system using variable impedance modulation.

Referring now, additionally, to Fig. 9, there is here illustrated the shifting of position of points A, B and C, from the positions which these points would occupy if ordinary level modulation were employed with my system, as already illustrated in Fig. 5. In Fig. 9, it will be noted that point C, the quiescent point of the system when no modulation is impressed upon the carrier, is now located much closer to point B than it is to point A. This effect is secured by causing the secondary circuit of Fig. 1 which includes coil 19 to be tuned to the low frequency side of the carrier frequency. It is to be understood that the maximum modulation percentage may be increased or decreased by the shifting of point C to some other value, which result may be brought about by changing the constants of various circuits, or by changing the values of the potentials used, e. g. the grid-bias voltage of the reactance tube modulator.

Figure 10:
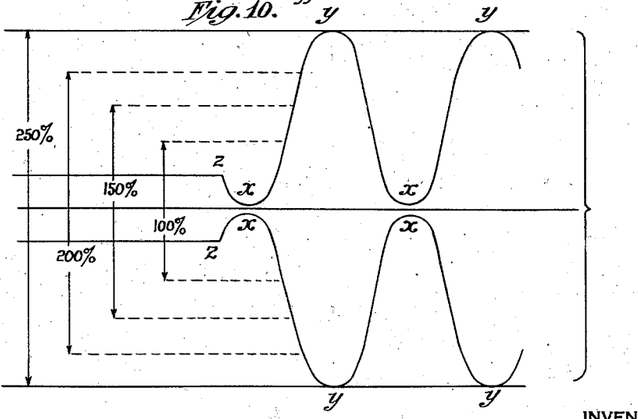
Fig. 10 is a graphical representation of the type of modulated carrier output produced according to my invention when carrier suppression is not utilized.

Referring now, additionally, to Fig. 10, there is here illustrated the manner in which the carrier output of a typical system such as that shown in Fig. 1 will appear when electron tube 3 is so chosen and connected as to have the characteristic curve of Fig. 7 and when the secondary tuned circuit, including coil 19, is likewise adjusted so that points A, B and C will be located as shown in Fig. 9, it being understood that the particular values here chosen for illustrative purposes are arbitrary and that other values may be chosen without altering the operation of the system as a whole, according to my invention.

In Fig. 10, the unmodulated carrier extends between points $z$—$z$, this unmodulated carrier corresponding to the quiescent frequency indicated at point C of Fig. 9. When the audio-frequency control grid potential is varied along the characteristic curve shown in Fig. 7, between limits of 20 volts negative and 20 volts positive, for example, the increase of plate current will be only about 2½ milli-amperes and, accordingly, the carrier current of Fig. 10 will be reduced only to the points $x$—$x$ during the positive portion of the modulation cycle. On the other hand, when the control grid goes negative to the extent of 20 volts the plate current will be altered by about 10 milli-amperes and the carrier will accordingly increase by a relatively great amount until it reaches the points $y$—$y$, during the negative portion of the modulation cycle. Points $x$—$x$ correspond to point B of Fig. 9 and points $y$—$y$ correspond to point A of this same figure. It can thus be seen that a greater reactive change takes place in the modulator tube 2 during the negative portion of the grid cycle than takes place during the positive portion of this cycle. This effect allows the modulation to reach a very high percentage during the negative portion of the cycle and yet prevents the carrier from completely cutting off during the positive portion of this cycle.

In Fig. 10, the carrier is illustrated as increasing at points $y$—$y$ to about five times the value which it has when unmodulated, while the minimum amplitude of the carrier is at points $x$—$x$, which may be made to lie as close as desired to zero amplitude. Applying to the illustrative case of Fig. 10 the conventional definition of percentage modulation as the ratio of half the difference between the maximum and minimum amplitudes of the carrier to the average amplitude thereof, it can be seen that my system, when adjusted so as to produce the carrier output curves shown in Fig. 10, will yield substantially 250 per cent modulation. If the various adjustments above-mentioned be altered so that the maximum peaks $y$—$y$ are only four times the amplitude of the unmodulated carrier, the modulation will be approximately 200 per cent and, if adjusted so that the maxima of three times the amplitude of the unmodulated carrier, the modulation will be about 150 per cent. These alternative adjustments are indicated in Fig. 10, where there is also shown the maximum modulation of 100 per cent obtainable by conventional modulation systems not employing my invention. It will be apparent from a consideration of Fig. 10, that my system allows the production of modulation peaks far exceeding those possible with conventional systems, e. g. the Heising modulation system, and yet my system avoids the production of distortion, due to the fact that there is no tendency for the modulation minima to pass through the zero point, which would cause such distortion.

Figure 2:
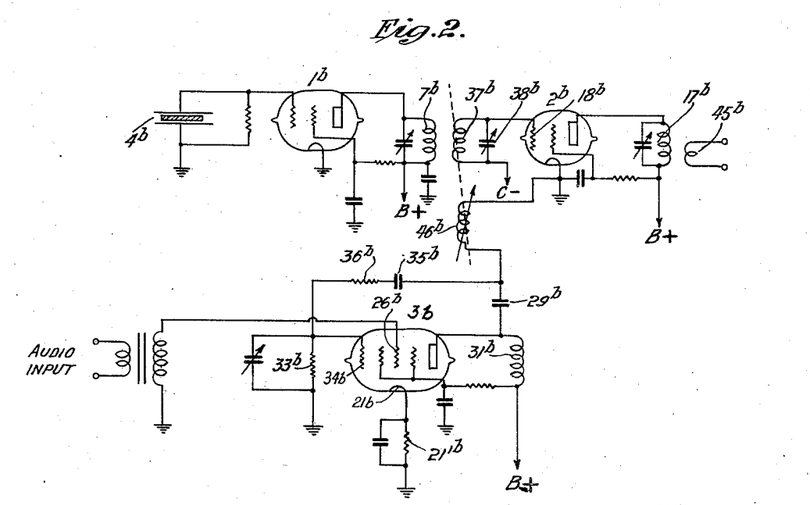
Fig. 2 represents one form of absorption modulation system, also embodying my invention.

Referring now to Fig. 2, there is here shown a modulation system wherein variable reactance electron tube 3b is controlled by the audio-frequency modulation currents in a manner similar to that employed in the circuit of Fig. 1, but this tube acts to modulate amplifier tube 2b by means of absorption coil 46b, coupled to secondary tuned circuit 37b—38b. This latter circuit feeds control grid 18b of tube 2b and the output of this tube appears in tuned anode circuit 17b, to which is coupled an energy utilization circuit 45b. Tube 1b is excited by crystal 4b and delivers its oscillatory output to a tuned circuit including coil 7b which, in turn, is coupled to coil 37b. The operation of the circuit of Fig. 2 for ordinary level modulation, is described in detail in my co-pending applications above-mentioned and the portions of the circuit not here described in detail bear similar reference numerals to those employed in Fig. 1 and operate in a similar fashion. When the system of Fig. 2 is operated to secure ordinary level modulation the characteristic curve of Fig. 5 illustrates the location of modulation points A, B and C, as previously described in connection with Fig. 1.

Figure 8:
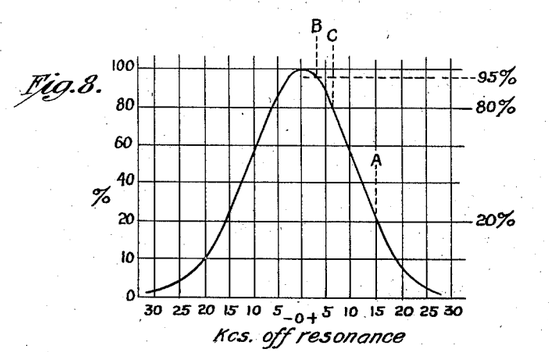
Fig. 8 is a graphical representation of the resonance curve of a modulated amplifier tube used according to my invention in a system employing absorption modulation.

In order to alter the system of Fig. 2 so as to give high level modulation, the absorption circuit including 46b and reactance modulator tube 3b is tuned to the high frequency side of the carrier frequency. The selectivity curve of such system is shown in Fig. 8, where it will be noted that quiescent point C has again been shifted so as to be situated much closer to point B than it is to point A. The reasons for this shift are analogous to those discussed in connection with Fig. 9, and such shift is brought about by suitable adjustment of the circuit constants, grid bias potentials, etc., as previously described. Tube 3b is also adjusted so that its characteristic curve will be non-linear, as illustratively shown in Fig. 7. Points $x$—$x$, $y$—$y$ and $z$—$z$, of Fig. 7, correspond respectively to points B, A and C, of Fig. 8. The graphs of Fig. 10 are equally illustrative of the carrier output of a system employing my invention in connection with the circuit of Fig. 2, and the various determinant points of Fig. 10 correspond to points A, B and C, of Fig. 8, in a manner analogous to that discussed in connection with Fig. 9.

Figure 3:
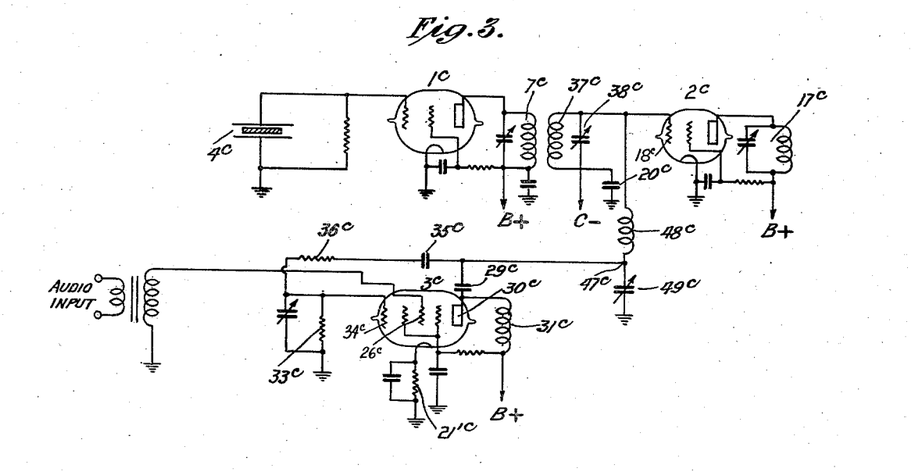
Fig. 3 shows a variant form of absorption modulation system.

In Fig. 3 there is shown a circuit employing absorption type modulation in a manner somewhat different from that employed in the circuit shown in Fig. 2. The oscillator tube 1c and modulated tube 2c, are connected in a fashion similar to that shown in Fig. 2. Likewise tube 3c functions as a variable reactance modulator in the same fashion described in connection with Figs. 1 and 2. The transfer of energy between tube 3c and the input circuit of tube 2c is by a connection to the midpoint 47c of a series resonant circuit comprising inductance 48c and capacity 49c. This latter resonant circuit is connected as a whole in parallel with the input circuit of tube 2c and is detuned from the resonant frequency of the circuit comprising inductance 37c and capacity 38c, which latter circuit feeds the input grid 18c of tube 2c. The degree of detuning of circuit 48c, 49c, would correspond to point C, shown in Fig. 5, for ordinary level modulation. However, this circuit absorbs energy in accordance with the variation of this effective impedance by the modulating action of tube 2c, and for high level modulation, the circuit should be tuned to a point corresponding to point C of Fig. 8. Modulator tube 3c is likewise adjusted so as to display the characteristic curve of Fig. 7. Under these conditions, the operation of the system shown in Fig. 3 is substantially identical with that already described in connection with Fig. 2.

Figure 4:
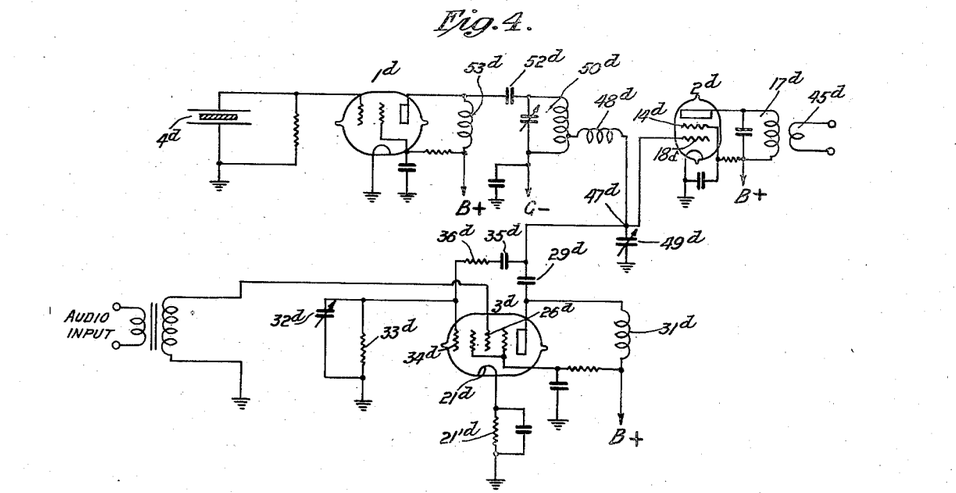
Fig. 4 shows another form of impedance modulation system.

Referring now to Fig. 4, I have here shown another type of circuit employing my invention and adapted to operate by means of impedance modulation. In the case of this circuit, the oscillator tube 1d, excited by piezo-electric crystal 4d, has its tuned output circuit 50d fed via coupling condenser 52d and this output circuit is coupled to the control input grid 18d of modulated tube 2d via coil 48d. In series with coil 48d is capacity 49d, forming a series resonant circuit. Reactance modulator tube 3d, and its associated circuit elements, are connected so as to function in the manner already described in connection with Fig. 1, and the effective capacity of tube 3d, modulated by the audio-frequency input thereof, is effectively shunted across condenser 49d by means of a connection made from tube 3d to coupling circuit 48d—49d, at the junction point 47d.

Tuned circuit 48d—49d, is adjusted so that the resonant point thereof will be located somewhat away from the resonant point of circuit 50d. In this fashion, the radio frequency energy supplied to grid 18d, will be modulated in accordance with the effective impedance of circuit 48d—49d, this impedance, in turn, varying in accordance with the audio-frequency modulations impressed upon tube 3d. While, for ordinary level modulation, circuit 48d—49d would be tuned to a point corresponding to C of Fig. 5, yet for the practice of this invention, the tuned coupling circuit is adjusted to the point C shown in Fig. 9, while reactance modulator tube 3d is adjusted so as to present a characteristic curve similar to that shown in Fig. 7. The carrier output will then be modulated as shown in Fig. 10, for the reasons above explained in connection with Fig. 1, the system as a whole functioning in a fashion analogous to that shown in Fig. 1.

Figure 6:
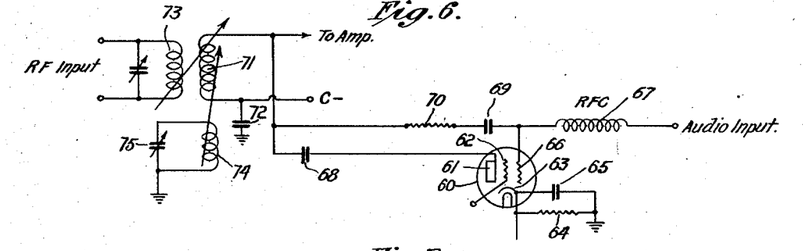
Fig. 6 shows, in part, an impedance modulation system embodying my invention as used with controlled carrier transmission.

Referring now to Fig. 6, there is here illustrated a portion of an impedance modulation system, in which this invention is employed so as to yield controlled carrier transmission. This impedance modulated circuit may be considered as a modified form of the circuit shown in Fig. 1.

In Fig. 6, the reactance modulator tube 60 has the anode 61 and the screen grid 62 fed from suitable sources of energy (not shown), and the cathode 63 is suitably biased by means of resistor 64, this latter being by-passed by condenser 65 to the ground. The control grid 66 is fed from an input of audio-frequency via radio frequency choke coil 67. Control grid 66 and anode 61 are suitably coupled via condensers 68 and 69 and resistor 70 to coil 71, the lower end of this coil being suitably by-passed via condenser 72 to the ground. Coil 71 corresponds to coil 19 of the circuit of Fig. 1 and receives its energy by being coupled to tuned coil 73, this latter coil corresponding to coil 7 of Fig. 1. The upper end of coil 71 is connected to an amplifier tube (not shown), in a fashion similar to that indicated in Fig. 1, and the lower end of coil 71 is connected to a suitable source of bias potential, indicated by C—. An additional parallel tuned circuit comprising coil 74 and condenser 75, is electromagnetically coupled to coil 71 and tuned to a frequency corresponding to the point C' (Fig. 11).

Figure 11:
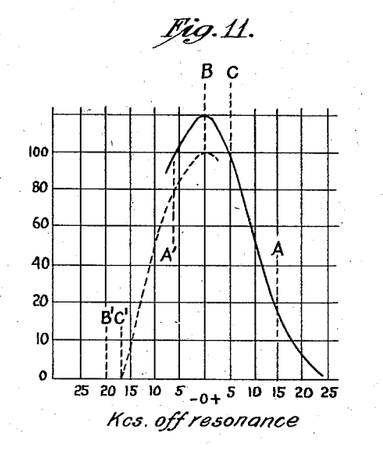
Fig. 11 shows resonance curves illustrating the operation of my invention, for both impedance and absorption modulation systems, when carrier suppression is utilized.
Figure 12:
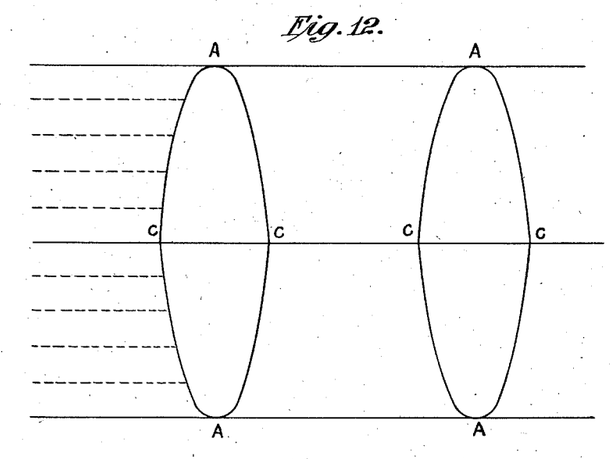
Fig. 12 is a graphical representation of the type of modulated carrier output produced by my invention when utilizing carrier suppression.

Referring now, additionally, to Fig. 11, the dotted graph is the resonance curve of the circuit comprising coil 71 and reactance modulator tube 60, this circuit being tuned to the point C', when unmodulated, as just described. It will be noted that point C' corresponds to zero output of carrier frequency. The reactance modulator tube circuit is so adjusted as to exhibit characteristics similar to those shown by the graph of Fig. 7, whereby audio-modulation in one direction will cause the resonance point of the impedance modulation circuit to rise to the position indicated at A', while modulation in the other direction will have substantially no effect, since the carrier is already at zero. Reference is now made to Fig. 12, where the carrier output corresponding to the circuit just shown, is illustrated. It will be noted that the minimum carrier, indicated by C, now completely reaches zero, while the maximum point is indicated by A. Thus, an unmodulated carrier is completely suppressed.

The function of circuit 74, 75 (Fig. 6), is to act as an additional rejection circuit, producing a quite sharp cut-off, but it is to be understood that other means familiar in the art for securing such sharp cut-off, may be employed in lieu of the rejection circuit here illustrated.

Referring again to Fig. 11, the solid graph there shown represents the resonance curve of an absorption type modulation system, also designed to secure complete carrier suppression. The actual circuits used, may be, for example, those of Fig. 2 or Fig. 3, previously discussed. In order to utilize these circuits for complete carrier current suppression, the absorption circuits themselves are coupled closer to the modulated amplifier grid circuit than in the cases previously discussed. The method of securing such closer coupling is familiar in the art and accordingly no detailed description thereof is considered necessary. Due to such closer coupling, the point C is moved up to the position indicated in Fig. 11, i. e. at 100 per cent absorption. Accordingly, the portion of the graph along between points B and C can have no effect upon transmission, since absorption is already complete at point C. It can be seen that, by appropriate adjustments, this invention may be employed to produce a carrier output having a typical curve of any predetermined form between that secured when the impedance or absorption modulation circuits are adjusted to the point C shown in Fig. 5, yielding a possible maximum of 100 per cent modulation, and the adjustments just described in connection with Fig. 11. From the foregoing description, it will be apparent that this system of my invention differs from the usual controlled carrier transmitter systems in the respect that only the modulation peaks increase and appear as a radiated signal, whereas in controlled carrier systems of the prior art, the unmodulated carrier increase is nearly proportional to the degree of modulation, thereby maintaining the usual approximately 100 per cent modulation level.

In comparison with a typical modulation system of the prior art, such as the Heising system, it will be noted that with such latter system, irrespective of whether the amplifier be biased so as to operate as a class A, B, or C type, under no conditions would it be possible to obtain a higher percentage of modulation than 100 per cent without cutting off the carrier, and the output wave will continue to have free energy, equal positive and negative peaks, and consequently will be badly distorted due to such cut-off. This is true because the plate current will rise during the positive portion of the audio-frequency input cycle and will be cut-off during the negative portion of this cycle, thus yielding a rising as well as a descending magnetic field in the modulation choke or transformer used with the Heising system. Such magnetic field will produce almost equal positive and negative peaks. Although it is known in the art to reduce distortion in the case of the Heising system by employing a plurality of tubes in a push-pull circuit, yet such distortion will still be present, whereas with an actual typical transmitter constructed according to the invention herein described, the modulation response varied not more than ±3 decibels, when measured over a range of frequencies extending from 20 to 20,000 cycles, thus indicating substantially distortionless performance, at a modulation level of 250 per cent.

While I have above-described certain embodiments of my invention, it is to be understood that it is possible to modify the particular type of impedance modulation or absorption modulation circuits with which the invention is to be practiced, without departing from the spirit of the invention.

What is claimed is:

1. In a modulation system, a source of carrier frequency energy, a modulated amplifier excited by said energy, variable impedance coupling means feeding said energy from said source to said modulated amplifier, said coupling means including a series resonant circuit having a mid-connection between the capacitative and inductive elements thereof, tuned to a frequency slightly different from said carrier frequency, and impedance varying means coupled to the mid-connection of said series resonant circuit, said impedance varying means including an electronic tube having an effective reactance varying in accordance with said audio frequency and exhibiting anode current saturation, and means for biasing said tube to a zero modulation point so much nearer the saturation point of the anode current than the minimum anode current point that the audio-frequency modulation causes greater changes of the effective tube reactance in one direction than in the other direction and thereby varies the effective capacity of said electronic tube more in one direction than in the other direction.

2. In a modulation system, a source of carrier frequency, a first tuned circuit fed by said carrier frequency, a series resonant circuit having a connection between the capacitative and inductive elements thereof coupled to said first tuned circuit and slightly detuned therefrom, a load coupled to the mid-connection of said series resonant circuit so as to receive energy therefrom, a multi-element electronic tube exhibiting anode current saturation also connected to said mid-connection and effectively in shunt with the capacity of said series resonant circuit so as to vary the tuning thereof, a source of audio-frequency modulating energy connected to one grid of said tube, and means for biasing said electronic tube to a zero modulation point so much nearer the saturation point of the anode current than the minimum anode current point that the modulation causes greater changes of the effective tube reactance and consequent equivalent capacity, in one direction than in the other direction.

3. In a high level modulation system, a source of carrier frequency energy, a modulated amplifier excited by said energy, primary tuned circuit means coupling said source and said modulated amplifier and tuned to said carrier frequency, and a secondary resonant circuit discrete from but coupled directly to said primary coupling means and tuned to a frequency slightly different from said carrier frequency, said secondary circuit including an electronic tube arranged as a variable capacity modulator for varying the resonant period of said secondary circuit at audio frequency and exhibiting anode current saturation and means for biasing said tube to a zero modulation point so much nearer the saturation point of the anode current than the minimum anode current point that the modulation causes greater changes of the effective tube reactance in one direction than in the other direction.

4. System according to claim 3, in which said secondary resonant circuit is quiescently tuned to a frequency corresponding to a point upon the resonance curve of said circuit lying closer to the resonant frequency of said primary circuit than to the cut-off point thereof, and lying upon the upper side of said resonant frequency.

5. A system according to claim 3, in which said primary and said secondary circuits are closely coupled and said secondary resonant circuit is quiescently tuned to a frequency corresponding to a point upon the resonance curve of said circuit lying closer to the resonant frequency of said primary circuit than to the cut-off point thereof, and lying upon the upper side of said resonant frequency, said point of quiescent tuning being located substantially at the resonant frequency of the frequency of said primary circuit, whereby maximum absorption and minimum radiation of carrier energy takes place at said point of quiescent tuning.

6. In a modulation system employing an electronic tube circuit as an effective variable capacity modulated at audio-frequency, means for adjusting the zero modulation point of the anode current curve of said electronic tube so as to be so much nearer the saturation point than the minimum anode current point that the audio-frequency grid modulation of said tube in the negative direction causes greater change in the anode current thereof, and consequently greater change in the effective capacity of the circuit, than does an equivalent degree of grid modulation in the positive direction, and a circuit controlling the energy radiated by said system and quiescently tuned to a point displaced from the mid-point of one linear portion of the resonance curve thereof and coupled to said modulation circuit so that said greater changes of effective capacity of said modulation circuit tend to shift said quiescently tuned point along the linear portion of said resonance curve in a direction wherein such shift is possible without departing from said linear portion, whereby modulation greater than 100 per cent is possible in said direction of shift.

7. Method of high level modulation in a system wherein a first voice frequency actuated electronic tube circuit exhibiting variable capacity effects is caused to modulate the radio frequency energy in a second tuned circuit to which said tube circuit is coupled, including the steps of adjusting said electronic tube circuit so that the voice-frequency actuated tube thereof exhibits saturation characteristics in the grid potential-anode current curve thereof and maintaining bias and modulation of said tube at such relative levels that the point of zero modulation is nearer the saturation point of said anode current curve than the minimum anode current point and the modulation causes greater effective changes in the tube reactance in one direction than in the other direction.

8. Method of high level modulation together with carrier suppression in a system according to claim 7, including the additional steps of adjusting said second tuned circuit to a quiescent point along the resonance curve thereof with respect to carrier frequency, said quiescent point lying substantially where said curve just reaches zero per cent of such carrier frequency, and securing modulation by varying the impedance of said second tuned circuit in accordance with changes in the effective capacity of said first circuit.

9. Method of high level modulation together with carrier suppression in a system according to claim 7, including the additional steps of adjusting said second tuned circuit to a quiescent point along the resonance curve thereof with respect to carrier frequency, lying substantially at 100 per cent of such carrier frequency and securing modulation by varying the absorption of energy from said second tuned circuit in accordance with changes in the effective capacity of said first circuit.

10. In a high level modulation system, a first resonant circuit supplied with carrier energy at a frequency corresponding to the natural period of said circuit, a second series resonant circuit coupled to said first circuit and tuned to a frequency slightly different from the frequency of said carrier energy, means for varying the effective resonant frequency of said second circuit at audio frequency, whereby the energy derived by said second circuit through its coupling with said first circuit is modulated at said audio frequency, means for withdrawing at least part of the modulated energy from said second series resonant circuit, said means for varying the effective resonant frequency of said second circuit at audio frequency including an electronic tube exhibiting anode current saturation and so biased that the zero modulation point thereof lies nearer the saturation point of the anode current than the minimum anode current point, whereby audio frequency grid modulation causes greater changes of the effective tube reactance in one direction than in the other direction and consequent greater changes of the resonant frequency of said second circuit in one direction than in the other direction, and a parallel tuned rejection circuit coupled to said second resonant circuit, said second resonant circuit and said rejection circuit both being tuned to a point upon the resonance curve thereof lying closer to the cut-off frequency point of said first resonant circuit than to the resonant frequency point thereof, and lying upon the lower side of said resonant frequency, said point lying substantially at said cut-off point, whereby at the point of quiescent modulation substantially no carrier energy is radiated by said system.

11. In a modulation system, a first resonant circuit supplied with carrier energy at a frequency corresponding to the natural period of said circuit, a second series resonant circuit coupled to said first circuit and tuned to a frequency different from the frequency of said carrier energy, means for varying the effective resonant frequency of said second circuit at audio frequency, a parallel tuned rejection circuit coupled to said second resonant circuit, said second resonant circuit and said rejection circuit both being tuned to a point upon the resonance curve thereof lying closer to the cut-off frequency point of said first resonant circuit than to the resonant frequency point thereof, and means for withdrawing at least part of the modulated energy from said second series resonant circuit, said means for varying the effective resonant frequency of said second circuit at audio frequency including an electronic tube exhibiting anode current saturation and so biased that the zero modulation point thereof lies nearer the saturation point of the anode current than the minimum anode current point, whereby audio frequency grid modulation causes greater changes of the effective tube reactance in one direction than in the other direction and consequent greater changes of the resonant frequency of said second circuit in one direction than in the other direction.

12. A system according to claim 10, in which second resonant and rejection circuits are tuned to a point lying upon the lower side of said resonant frequency.

13. A system according to claim 10, in which second resonant and rejection circuits are tuned to a point lying upon the lower side of said resonant frequency, said point lying substantially at said cut-off point, whereby at the point of quiescent modulation substantially no carrier energy is radiated by said system.

14. In a modulation system, a first resonant circuit supplied with carrier energy at a frequency corresponding to the natural period of said circuit, a series resonant circuit coupled to said first circuit and tuned to a frequency corresponding to a point on the resonance curve of the first resonant circuit which is closer to the cut-off frequency point on its low frequency side than to the resonant frequency point thereof, means for varying the effective resonant frequency of said series resonant circuit at an intelligence frequency to cause modulation of the carrier energy derived by it from said first circuit through its coupling thereto, and means for withdrawing at least part of the modulated energy from said series resonant circuit, said means for varying including an electronic tube having an effective reactance varying in accordance with said intelligence frequency and exhibiting anode current saturation, and means for biasing said tube to a zero modulation point so much nearer to the saturation point of the anode current than to the minimum anode current point that intelligence frequency modulation of the tube causes greater changes of the effective tube reactance in one direction than in the other direction and thereby varies its effective capacity more in one direction than in the other.

JOHN J. ANTALEK.

REFERENCES CITED

The following references are of record in the file of this patent:

UNITED STATES PATENTS

| Number | Name | Date |
| --- | --- | --- |
| 1,485,650 | Vennes | Mar. 4, 1924 |
| 1,699,711 | Peterson | Jan. 22, 1929 |
| 2,348,585 | Antalek | May 9, 1944 |